(12) United States Patent
Smith

(10) Patent No.: US 6,554,524 B1
(45) Date of Patent: Apr. 29, 2003

(54) CONNECTORS FOR TOWING CABLE AND THE LIKE

(75) Inventor: Jackson A. Smith, Clearbrook (CA)

(73) Assignee: Veneta Industries INC, Abbotsford (CA)

( * ) Notice: Subject to any disclaimer, the term of this patent is extended or adjusted under 35 U.S.C. 154(b) by 155 days.

(21) Appl. No.: 09/605,825

(22) Filed: Jun. 29, 2000

(30) Foreign Application Priority Data

Jun. 30, 1999 (CA) .............................. 2276658

(51) Int. Cl.[7] .............................. H02G 3/22; F16D 1/12
(52) U.S. Cl. .................. 403/78; 403/164; 403/322.2; 403/165
(58) Field of Search ................... 403/157, 165, 403/322.2, 78, 164; 24/652

(56) References Cited

U.S. PATENT DOCUMENTS

| 933,625 | A | * | 9/1909 | Clarkson | 403/164 |
|---|---|---|---|---|---|
| 1,618,851 | A | * | 2/1927 | Thunberg et al. | 403/165 |
| 1,984,350 | A | * | 12/1934 | Halsey et al. | 403/235 |
| 2,036,953 | A | * | 4/1936 | Morris | 24/652 X |
| 3,827,820 | A | * | 8/1974 | Hoffman | 403/165 |
| 4,600,331 | A | * | 7/1986 | Gray | 403/165 |
| 4,687,365 | A | * | 8/1987 | Promersberger | 403/164 X |
| 5,433,548 | A | * | 7/1995 | Roberts et al. | 403/322.2 X |
| 5,494,367 | A | * | 2/1996 | Epkens | 403/164 |
| 5,529,421 | A | * | 6/1996 | Epkens | 403/164 |
| 5,607,248 | A | * | 3/1997 | Hasse | 403/165 X |
| 5,772,350 | A | * | 6/1998 | Ferguson et al. | 403/164 X |

* cited by examiner

Primary Examiner—Lynne H. Browne
Assistant Examiner—Ernesto Garcia
(74) Attorney, Agent, or Firm—Weldon F Green

(57) ABSTRACT

A connector for towing cable or conduit in which one head includes a socket for the mating reception and separation of an aligned matching projection presented by the other head with the opposed aligned surfaces of socket and matching projection in sliding fit, a spring-loaded ball assembly presented by one head such that only a minor portion of the spring-loaded ball protrudes beyond its opposed aligned surface to register within a matching groove formation in the opposed aligned surface of the other head, and a set screw regulating the spring-loading of the ball so that displacement of the ball from the groove formation and separation occurs only when the tensile load applied to the mating heads exceeds the load imposed upon the ball; and with one head including a swivel shaft providing a connection to the other head and supported for rotation therewithin upon a combination of dual thrust bearings at both ends including one or more of a three (3) piece needle bearing, a flanged Permaglide™ bearing or a radial thrust ball bearing and variations thereof.

10 Claims, 6 Drawing Sheets

CONNECTORS FOR TOWING CABLE AND THE LIKE

FIELD OF THE INVENTION

This invention relates to improvements in connectors for towing cable or conduit or the like, i.e., for stringing cables from pole to pole, hauling cable through underground conduits, and more particularly to swivel connectors for use with power and telephone cable, and especially to "disconnect" swivels whose components separate under excess loading to preserve the cable especially for use with fibre optic cable and for hauling conduit for cable through underground bore holes.

BACKGROUND OF THE INVENTION

The swivel connector disclosed in U.S. Pat. No. 2,387,599 uses ball bearings travelling in a race defined by or secured to opposed male and female components to interconnect and support same for rotation in relation to each other which male and female components thereof are to be connected to a hauling line and a cable respectively.

Such swivel connector cannot be taken safely around a pulley or bullwheel under load.

The swivel connectors revealed by U.S. Pat. Nos. 5,494,367 and 5,529,421 provide in one embodiment a first swivel head which is attached to a swivel shaft secured within a hollow body by a locking nut which in turn is connected to a second swivel head. Tapered roller bearings support the swivel shaft for rotation in one setting and transmit tensile loading from the shaft to the hollow body.

A series of restrictive seals serve to block the passage of debris from the outside to the interior.

In another embodiment the first and second swivel heads are attached to an opposed pair of swivel shafts and likewise are provided with restrictive seals with the object of utilizing the capability of one swivel head should the other fail.

The swivel connectors of U.S. Pat. Nos. 5,594,367 and 5,529,421 cannot, under load, be safely taken around a pulley or bullwheel.

The breakaway swivel connector disclosed in U.S. Pat. No. 4,678,365 has a centre pin from which material has been removed centrally internally thereof to create a shear factor so as to limit the load applied to the cable in installing same on poles or in underground ducts.

The breakaway connector of U.S. Pat. No. 5,122,007 uses assorted mechanical pin-type breakaways to protect the cable from damage in similar circumstances.

Both aforementioned breakaway connectors require replacement parts to be reinstalled after each cable pull has been completed and the sheared pin parts removed.

Each of the latter breakaway type connectors may require as many as twenty five (25) differently calibrated pins, preferably colour coded for identification of the breaking tension for installation either in the work place or in the field of operation. Such an arrangement, however, gives rise to human error in the selection of the requisite pin for the particular pull.

The breakaway components of the aforementioned U.S. Pat. Nos. 4,687,365 and 5,122,007 have been designed to separate at plus or minus ten (10) percent of their rated break load. Those limits, however, are not always precise or finite in that machine shop operations and the mechanical functions performed are also subject to human error leading to possible failure of the cable pull.

Moreover, the latter mentioned swivel connectors likewise are not designed to be safely taken around pulleys or bullwheels under load.

Further, the swivel connectors of all aforementioned U.S. patents operate safely only if loaded in one direction. Hence if incorrectly connected by attaching the wrong end to the cable to be pulled the swivel will fail and the cable pull aborted.

Other downside aspects inherent in the aforementioned breakaway connectors are the necessary disassembly to replace the break pins and then reassembly. Those steps can prove to be very costly in a field situation because of down time, because of potential loss of parts and the increased labour costs for disassembling and reassembling.

OBJECTS OF THE INVENTION

One principal object of this invention is to provide an improved swivel connector which can be loaded in either direction, that is, the swivel connector serves its purpose either way; and will operate whether the pull exerted is applied through the hauling line or through the cable itself.

Such swivel connector can include a separation or "disconnect" structure for limiting the pulling load.

Another principal object is to provide a swivel connector that can be taken safely around a pulley or bullwheel under load.

Still another principal object of this invention is to provide an improved separation or "disconnect" structure for a connector of the category under consideration which compared to known structures greatly minimizes the likelihood of damage to power and telephone cable and particularly to fibre optic cable during a cable pull whether overhead from pole to pole or underground in PVC ducts or conduits, in vaults or otherwise and to conduit hauled through underground bore holes.

Still another object is to provide an improved "disconnect" connector which is fully reusable in a subsequent cable pull without any dismantling or disassembly of the components thereof or the replacement of parts in the reassembly of same, whereby human error in selection of replacement parts and reinstallation is entirely eliminated.

Another object of this invention is to provide an improved swivel connector that can be more easily utilized in confined spaces such as in riser ducts in high rise buildings, and follow a shorter bend radius as compared to known swivel connectors particularly when used in underground PVC ducts with its sweeps and bends.

It is also a specific object to provide an improved swivel connector of the type in which the separation or "disconnect" tension characteristics have a substantially increased range of from about 100 psi to 5,000 psi and beyond if so desired.

Other important objects are to provide connectors including swivel connectors for the uses outlined which require low maintenance, are economically manufactured, do not require special tools in maintaining operability and have an extended operating life by virtue of the improved structure of same.

Features of the Invention

One feature of this invention resides in providing selected bearings for a swivel connector structure in which the swivel shaft is supported by and rotates within a bearing combination, in one embodiment, of a three (3)-piece dual thrust needle bearing at one end and by a flanged Permaglide™ bearing at the other end and in another embodiment the combination of Permaglide™ washer bearing and three (3)-piece needle dual thrust bearing at one end and a roller bearing at the other end.

Both embodiments are suitably sealed preferably by a Buna-N-O ring against ingress of debris and to contain lubricant which bearing combinations and seal confer upon the preferred embodiments the capability to be pulled safely under load in either direction; and further by reason of such combination of bearings the longitudinal dimension of connectors can be reduced, greatly facilitating travel through circuitous passageways and also around sheaves, pulleys or bullwheels.

Another feature of this invention resides in providing an interconnection between opposed surfaces of mating male and female components of a connector in the form of a selection of a spring loaded resilient steel ball mounted within an elongated passageway in either mating component to seat lowermost against an annular lip so shaped as to project a portion of the resilient steel ball beyond the opposed surface thereof and into a circumferentially extending matching recess or groove formation presented by the opposed surface of the other mating component, which spring loading of the steel ball can be so calibrated as to be forced from such groove formation and out of its seat into the elongated passageway only when the tensile loading applied to the mating components exceeds the spring loading applied to the resilient steel ball.

As a consequence of that arrangement the swivel components will separate or "disconnect" before the cable ruptures or is otherwise damaged.

When separation occurs no parts are destroyed. The steel ball forced from the groove formation into its passageway after separation is then restored to its seated disposition by the associated spring so that the mating components can simply be reconnected by exerting the required compression force to re-establish mating relation.

More particularly in one embodiment of the invention the elongated passageway with its seating lip extends outwardly to the exterior from the opposed surface of such mating component generally radially or at right angles. Where multiple spring loaded steel balls are to be utilized in such embodiment several spaced apart passageways with seating lips can be selectively arranged in opposed pairs or in equidistant separation so as to achieve greater control over the applied loading for releasably securing the components against separation.

It is also contemplated in accordance with the invention that in the case of such embodiment where multiple spring-loaded steel balls are utilized in one mating component several circumferentially extending groove formations in suitably spaced apart relation can be formed in the opposed surface of the other mating component which arrangement through selection of appropriate springs, balls and loading factors can be used to control separation of the components upon reaching their respective load limits.

Still more particularly another aspect of this invention resides in selecting a stainless steel helical spring element which will operate effectively within a confined space as in the elongated passageway mentioned, preferably a stainless steel wave spring and further, which can be calibrated in that setting through an appropriate ratchet dial set screw engagement so as to selectively finitely exert pressure over a range of between 100 psi to 5,000 psi or greater through the compression spring seat bearing upon the stainless steel ball.

Another feature of this invention resides in providing an alternative passageway configuration for housing the spring loaded stainless steel ball in the embraced or male mating component for presentation to the matching circumferential recess or groove formation of the embracing or female mating component which alternative passageway includes a first portion extending generally inwardly from an exposed end of the embraced or male mating component and generally parallel to the opposed surface thereof which first portion intersects with a second portion extending outwardly therefrom lowermost and angled so as to intersect with such opposed surface and terminating in the annular lip or seat.

With such alternative passageway so shaped a component of the force exerted by the set screw setting and wave spring is first transmitted from the spring seat to a first resilient stainless steel ball located lowermost in the first passageway portion which engages a second stainless steel ball located lowermost in the second angled portion and forces it into seating engagement with the annular lip and so establish a modified release level or disconnect limit for the mating components under tensile and other forces.

With this arrangement the length of the passageway can be increased without increasing the diameter of the part which allow for increasing the extent of the spring element and increased loading of the steel ball.

More particularly the forces to be exerted by the wave spring in the foregoing alternative setting utilizing two stainless steel balls against the second ball located lowermost in the second angled passageway are first applied to the first or inner ball located lowermost in the first parallel passageway portion which contacts and transmits the forces to the second ball occupying the angled portion and seated on the annular lip all through appropriate selection of dimensions for the passageway portions steel balls and wave spring element.

Another feature resides in providing the first portion of the aforesaid alternative passageway with a slightly increased diameter as compared to the diameter of the angled portion and providing steel balls of corresponding diameters with appropriate clearances.

It is also contemplated that the alternative passageway configuration be further modified to include at least two opposed angled portions lowermost leading from the first passageway portion and to opposed or spaced apart seating annular lips with the wave spring loading transmitted by the centrally located steel ball lowermost in the first parallel passageway portion to the two steel balls each occupying one of the angled passageway portions and seated against the opposed or spaced apart lips thereof to project beyond the bounding longitudinal surface thereof and into engagement with the opposed circumferential groove formation.

Still another feature resides in providing a unitary resilient steel ball and spring element so that placement of same within the cylindrically shaped passageway in certain embodiments is facilitated and the process of assembly streamlined.

Other features are to be found in the improved connectors, according to the invention, in that not only can the dimensions of the mating components be reduced through the selection of bearings and their dispositions as earlier mentioned but also through the simplification of the "disconnect" structure while maintaining the requisite loading capabilities; which reduced dimensions confer greater flexibility and endurance when passed around sheaves or pulleys or bullwheels or where a cable is pulled through the convolutions of conduits in buildings or buried, all for greater economic benefit.

Further advantages arise out of simplification of the connector structure in the steps of manufacture and assembly in the workplace and in the field with the savings in time and effort promoting greater profitability.

DRAWINGS

FIG. 1 is a perspective view of the exterior of one preferred embodiment of swivel connector constructed in accordance with the invention;

FIG. 2 is a cross-sectional view of one embodiment of swivel connector taken along the lines 2—2 of FIG. 1 in which the displaceable spring-loaded steel ball assembly is presented by the embracing mating female component to the circumferential groove in the embraced mating male component thereof and includes one preferred embodiment of the improved bearing combination to provide dual thrust and to take care of side loading;

DESCRIPTION

Figure 1:
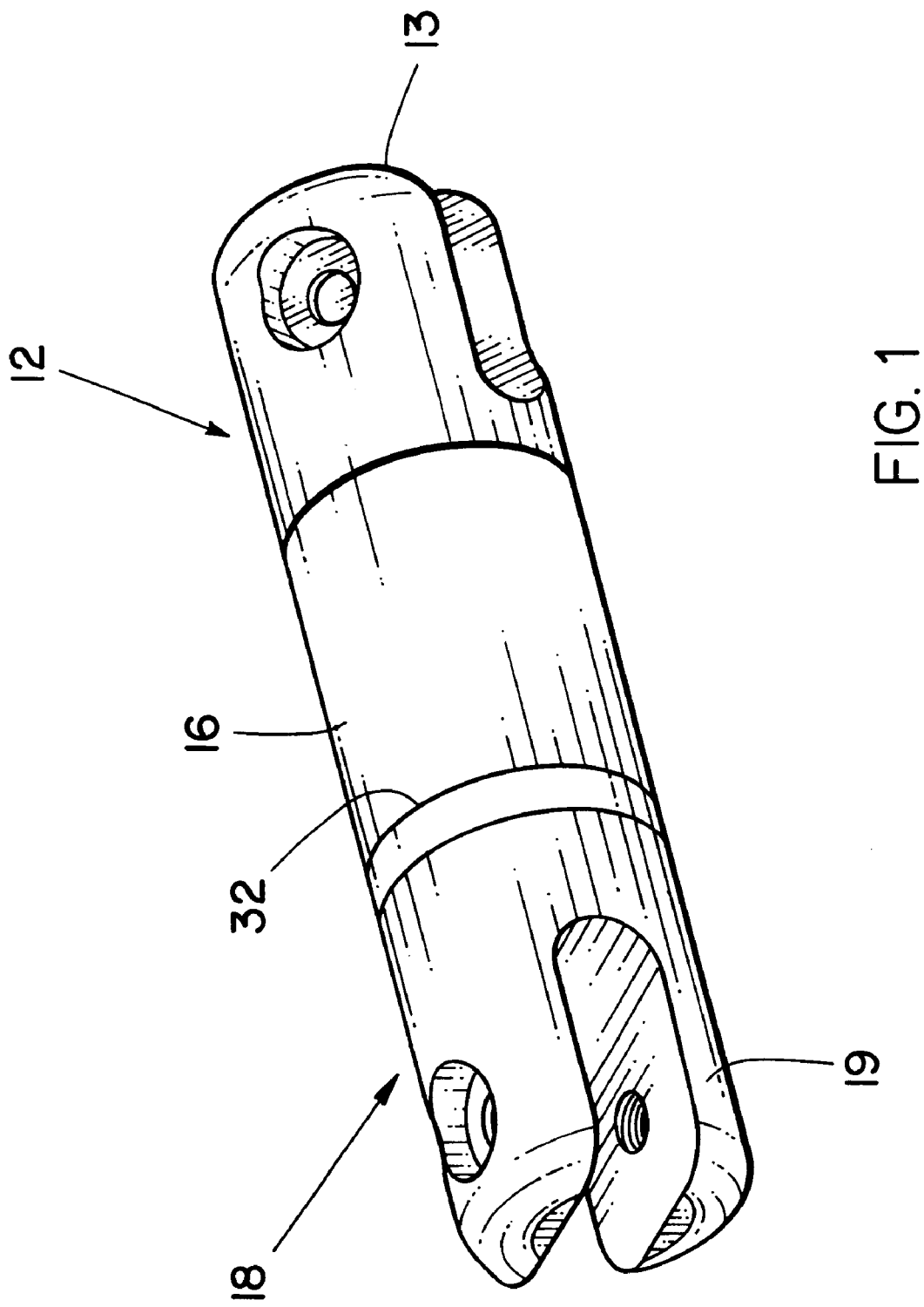
Figure 2:
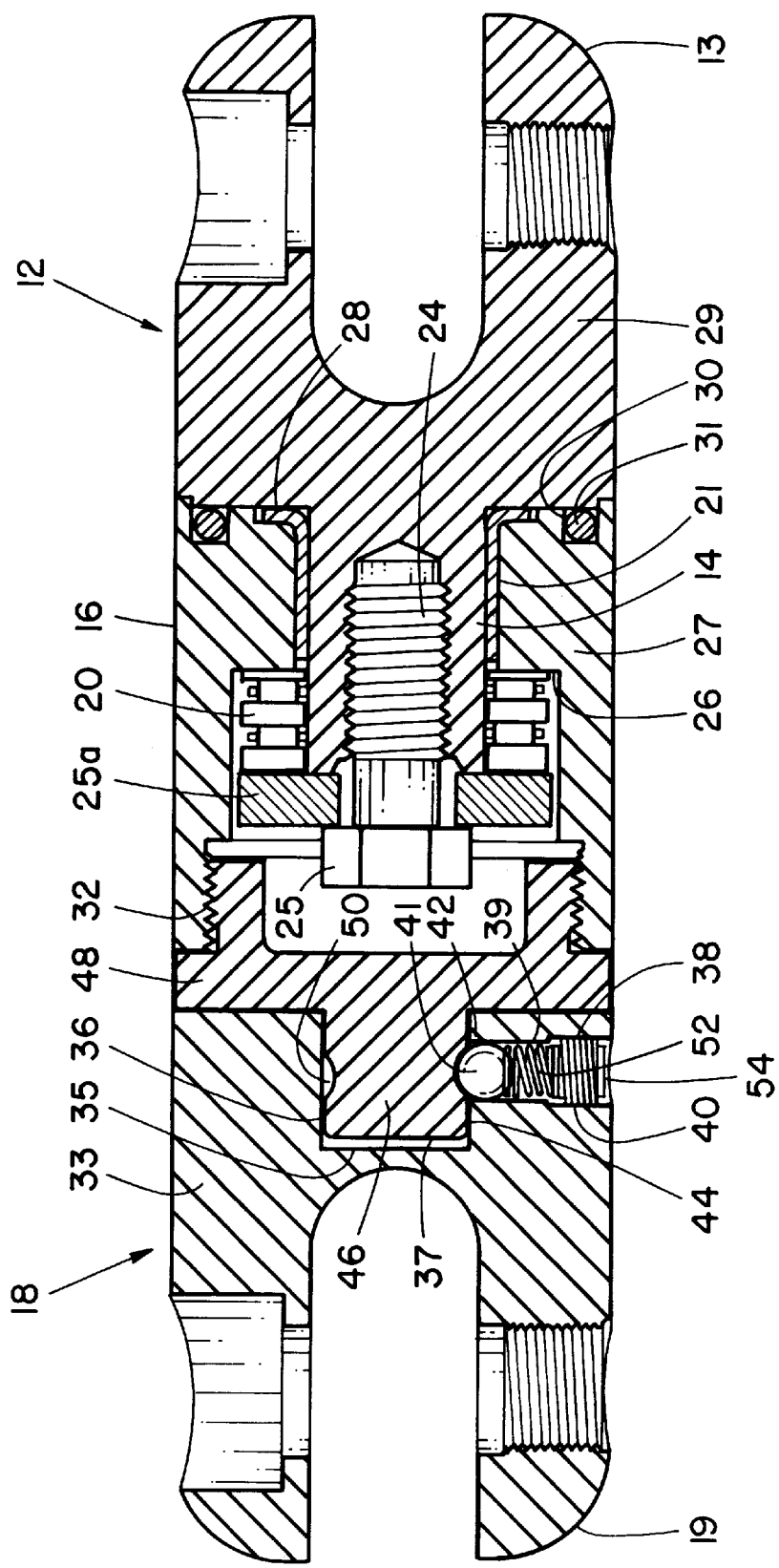
Figure 4:
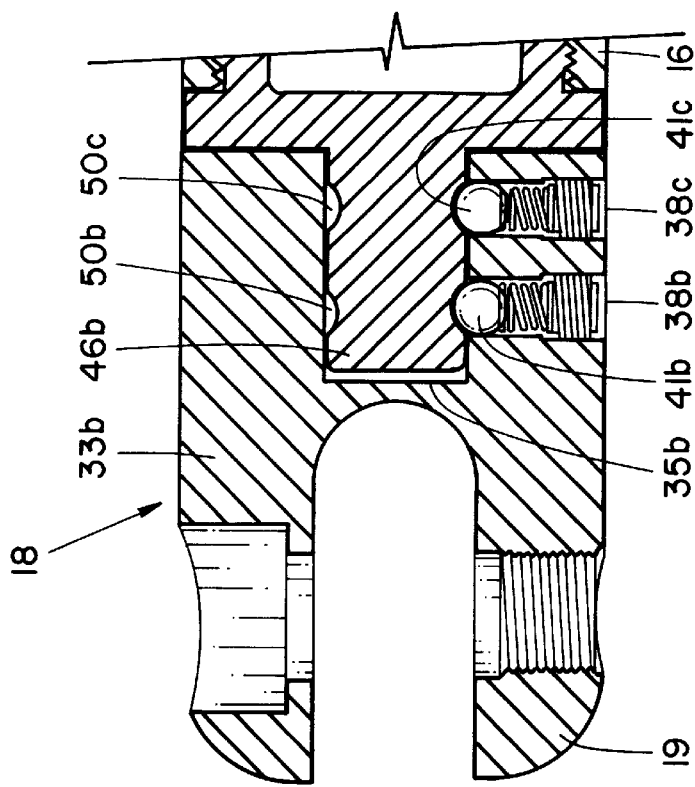
FIG. 4 is a cross-sectional view similar to FIGS. 2 and 3 of a further modified embodiment of the displaceable structure thereof with the remainder of the connector broken away.
Figure 3:
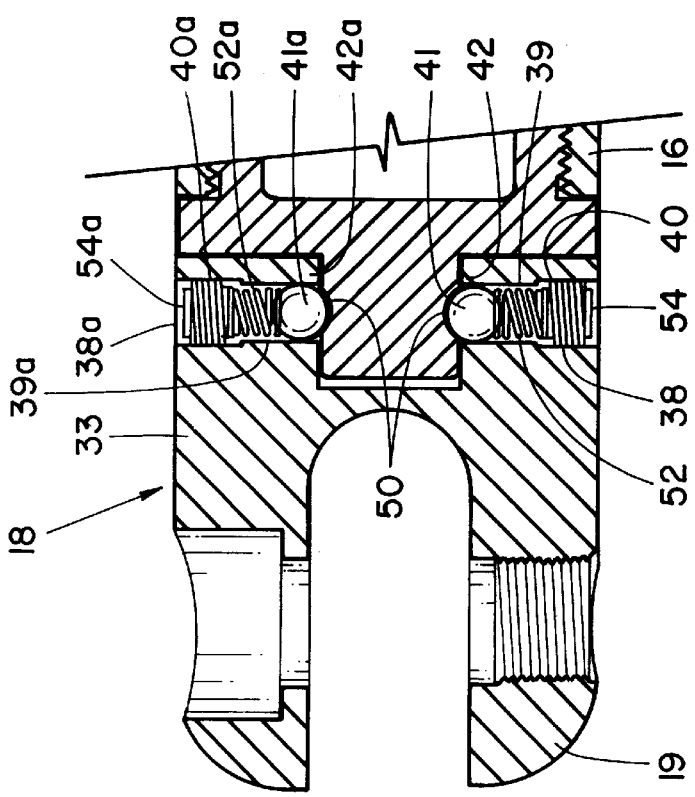
FIG. 3 is a cross-sectional view similar to FIG. 2 of a modified embodiment of the displaceable structure depicted in FIG. 2 with the remainder of the swivel connector broken away.
Figure 5:
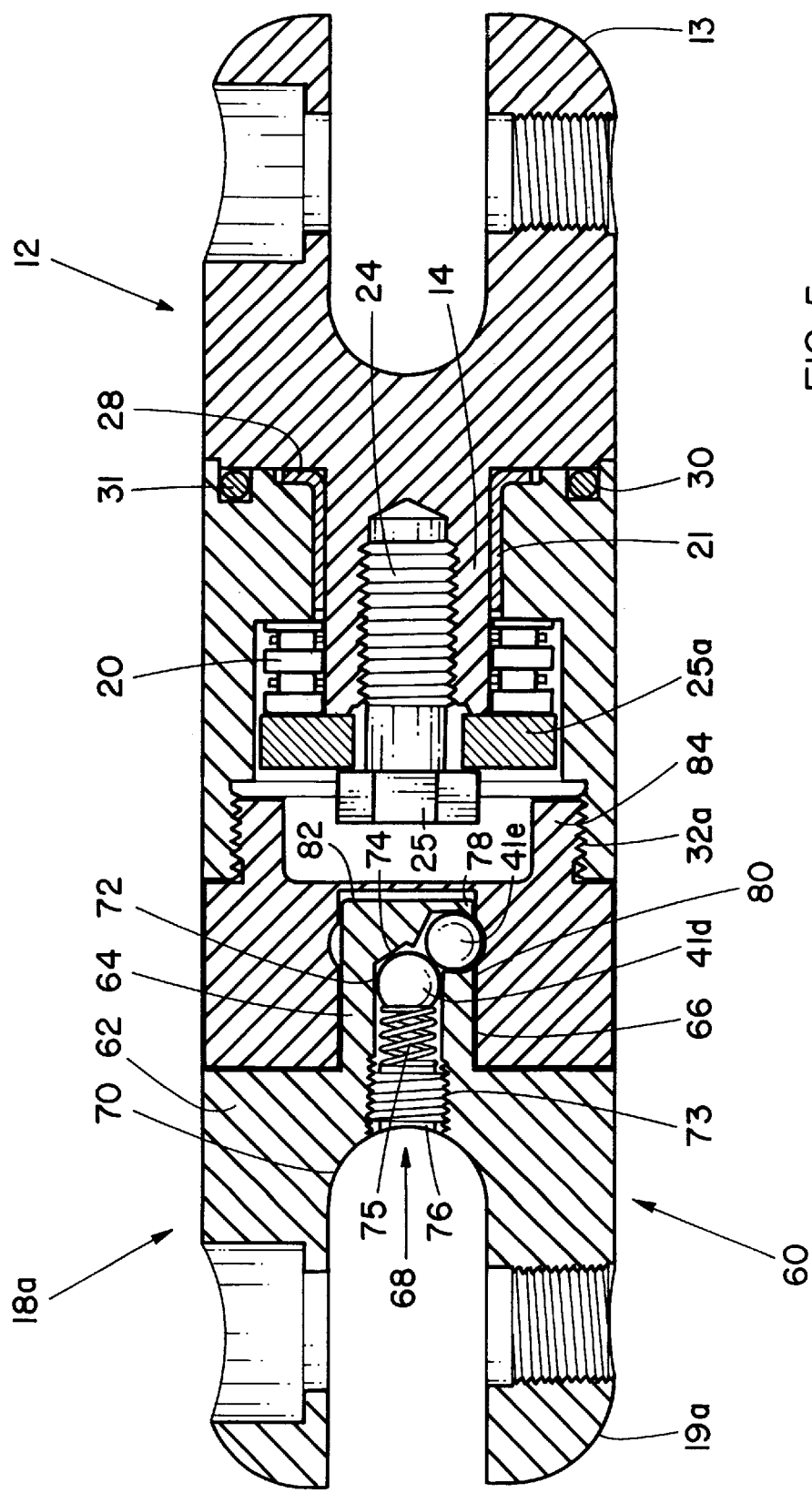
FIG. 5 is a cross-sectional view similar to FIG. 2 of an alternative embodiment of displaceable structure in which the spring-loaded steel ball assembly is presented by the embraced male mating component and the circumferential groove formation by the embracing female mating component thereof and includes the same embodiment of bearing combination to provide dual thrust and counter side loading.
Figure 6:
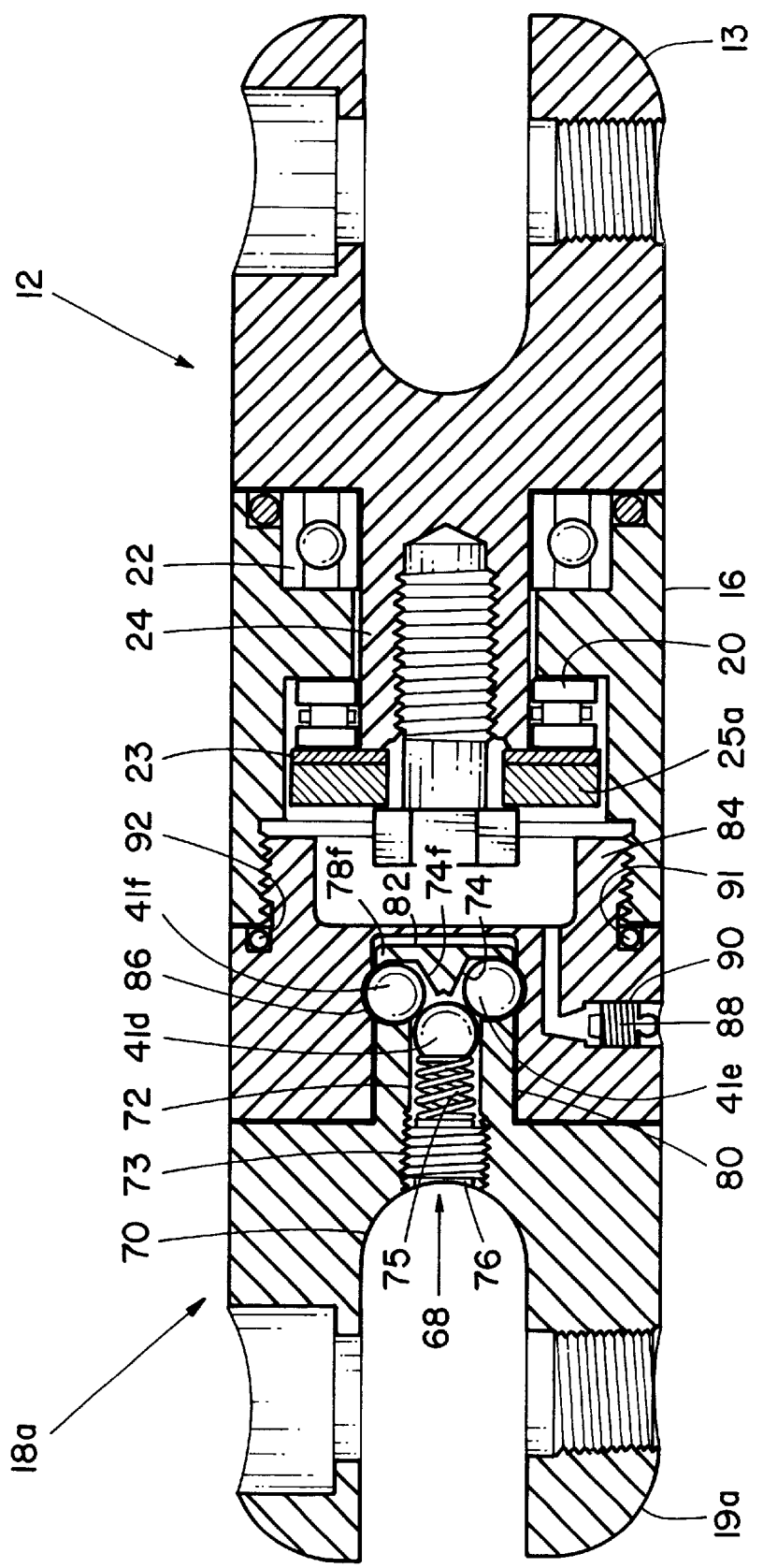
FIG. 6 is a cross-sectional view similar to FIG. 5 of an alternative embodiment of swivel connector with the displaceable or disconnect structure comparable to that depicted in FIG. 5 and including the other preferred embodiment of bearing combination constructed in accordance with the invention to provide dual thrust and counter side loading.
Figure 7:
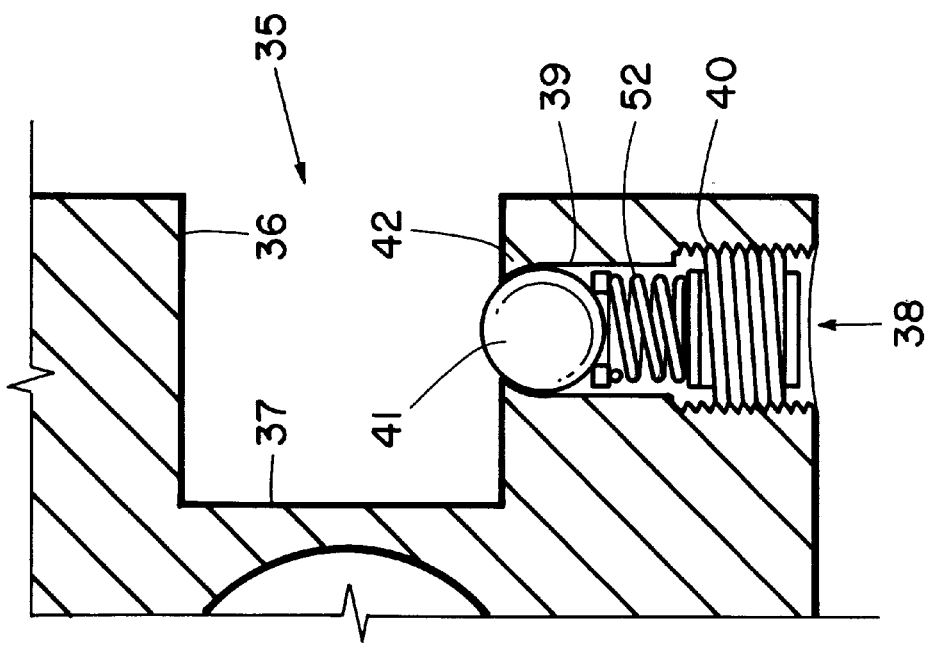
FIG. 7 is an enlarged view of the seated spring loaded ball assembly of FIG. 2 with the remainder of the connector broken away.
Figure 8:
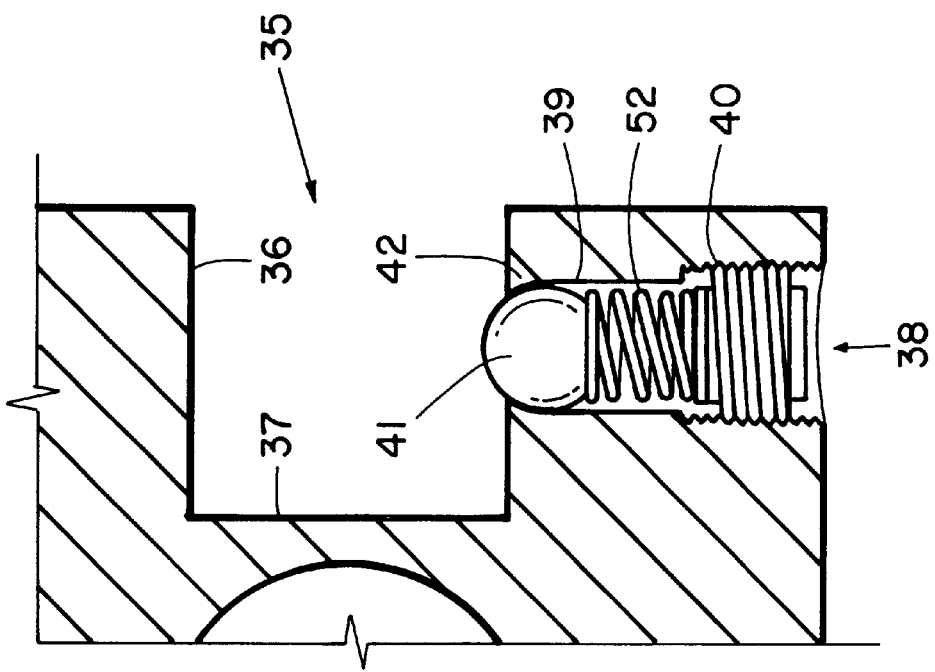
FIG. 8 is a view similar to FIG. 7 in which the spring and ball of the assembly are shown as integral or unitary.

The improved swivel connector depicted in FIG. 1 and revealed in cross-section in several modifications in FIGS. 2, 3 and 4 and in still other modifications in FIGS. 5 and 6 all include a swivel head formation 12 with associated clevis structure 13 at one end, having an integral tapped shaft portion 14 projecting into and supported for rotation within a centrally located hollow body formation 16.

Where the elements of the connectors are arranged in the same disposition those elements are given the same numbers in the several drawings.

Central hollow body formation 16 is provided at the opposite end with a second swivel head formation generally indicated at 18 in FIGS. 1 to 4 and at 18a in FIGS. 5 and 6 each with an associated clevis structure 19 and 19a respectively.

Clevis structures 13 and 19, 19a respectively, are suitably formed with each having one opening tapped to cooperate with the threaded shaft of a bolt (not shown) for securing the loop or eye of a hauling line and a cable to be towed all in a manner well understood in the field.

The embodiments of the swivel connectors of FIGS. 2 and 5 disclose a preferred arrangement of bearings for supporting swivel shaft portion 14 for rotation within central hollow body formation 16 and includes a three (3) piece needle dual thrust bearing 20 and a flanged Permaglide™ bearing 21 for taking side loads.

The alternative bearing combination of the swivel connector illustrated in FIG. 6 includes likewise a three (3) piece needle thrust bearing 20, a three (3) piece axial angular contact ball bearing 22 and a Permaglide™ washer bearing 23 in supporting swivel shaft portion 14 for rotation in hollow body formation 16.

In either arrangement of bearings both dual thrust and countering of side loading are provided so that the swivel connectors will safely operate whether pulled in either direction and especially can be safely taken around pulleys, sheaves and bullwheels.

Swivel head formation 12 is interconnected to central hollow body formation 16 by a bolt 24 threaded into the tapped shaft portion 14 with the head 25 having an extent to engage through a suitable bearing spacer washer 25a in FIGS. 2 and 5, the outer retainer face of the three (3) piece needle dual thrust bearing 20 with the opposed retainer face engaging the opposed surface 26 of internal annular shoulder formation 27 presented by hollow body formation 16.

In the arrangement illustrated in FIG. 6 the bearing spacer washer 25a bears against a Permaglide™ washer bearing 23 which in turn engages three (3) piece needle bearing 20.

The flanged Permaglide™ bearing 22 surrounding shaft portion 14 FIGS. 2 and 5 engages the inner surrounding surface of the shoulder formation 27 with the flanged portion 28 entered between the opposed surfaces of shoulder formation 27 and the body portion 29 of swivel head formation 12.

Central hollow body formation 16 is provided with an internal channel 30 in the surface abutting swivel head formation 12 in which a suitable O-ring seal 31 is registered to bar entry of dirt, water and debris, O-ring seal preferably having the characteristics of a Nitrile Buna-N-O-ring which is preferably glued into place in its seat.

According to FIG. 6 the head 25 of bolt 24 engages through annular bearing spacer washer 25a and Permaglide™ washer bearing 23, the three (3) piece needle dual thrust bearing 20 with axial angular contact ball bearing 21 positioned as shown to counter side loading as well as thrust applied in either direction.

The hollow body formation 16 of the connectors shown in FIGS. 2, 3, 4, 5 and 6 are releasably threadably connected as at 32 to the elements or components of the disconnect structure of swivel head formations 13, 18 and 18a, respectively, at the other end.

The characteristics and advantages of the bearing combinations of the swivel connectors shown in cross-section in FIGS. 2 and 5 and the alternative illustrated in FIG. 6, all of which give rise to dual thrust and all of which counter side loading, allowing the connector to be safely pulled in either direction around pulleys, sheaves or bullwheels and through circuitous ducts will be described in more detail in paragraphs to follow.

Disconnect Structures

The disconnect structure of swivel head formation 18 shown in cross-section in FIGS. 2, 3, 4, 7 and 8 includes a first mating or female element component 33 whose body portion has a generally cylindrically shaped open ended cavity or socket 35 defined by inner surface 36 and end wall 37.

Female body portion 33 is provided with an open-ended, two-step diameter passageway 38 extending generally radially inwardly therethrough including an inner portion 39 and an outer threaded portion 40. Inner portion 39 intersects with inner longitudinal surface 36 of socket 35.

A resilient stainless steel spherical ball 41 of a diameter corresponding substantially to that of inner portion 39 of passageway 38 but with requisite clearance and hardened to RC 58–62 is positioned at the bottom of inner passageway portion 39. In that disposition spherical ball 41 is seated against an integral annular lip 42 formed at the inner end of passageway 38 and so shaped that spherical ball 41 protrudes beyond lip 42 only up to between twenty-five (25) per cent to forty (40) per cent, a minor portion of its girth.

The generally cylindrically shaped longitudinal surface 44 of shaft portion 46 of the second mating or male component 48 presented by central hollow body formation 16 through threaded connection 32 is axially aligned with and closely embraced by surrounding inner surface 36 of the first mating or female component 33 but with the opposed surfaces 36, 44 having sufficient clearance for sliding fit longitudinally and to allow for requisite displacement under the swivelling action of the components.

In the embodiment of FIG. 2 male shaft portion 46 has a suitably shaped 360 degree circumferential groove formation 50 formed in surface 44 which groove formation cross section matches the curvature of the protruding portion of the selected stainless steel spherical ball 41 presented beyond annular lip 42 with ball 41 engaging or registering in groove formation 50 so as to releasably connect the mating elements 33, 48 under the loading force of a suitable helically shaped spring 52 disposed within passageway 38.

Preferably spring 52 is a suitably dimensioned stainless steel compression wave spring for nesting within inner portion 39 of passageway 28 and with its integral seat against stainless steel spherical ball 41. Wave spring 52 is so configured as to bear against and urge stainless steel ball 41 against lip formation 42 under the forces imposed by a suitable stainless steel hex set screw 54 threaded into the open end of passageway 38.

With spring-loaded stainless steel ball 41 registering in perimetral groove formation 50 mating female and male components 33, 48 of the embodiments of FIGS. 2 and 4 are held against separation but also establish, in effect, a swivel connection therebetween.

The resistance to displacement of wave spring 52 and steel ball 41 under loading applied to mating components 33 and 48 is determined by the setting of threaded set screw 54 within the threaded passageway portion 40 of passageway 38 which can be appropriately calibrated to establish a scale of imposed spring loading of ball 41.

Preferably a ratchet dial set screw well known in the field will be chosen in that greater precision in calibration is available with that option.

When the applied tensile loading of mating components 33, 48 by a hauling line connected to swivel head formation 18 through the associated clevis 19 and bolt (not illustrated) to tow a cable 10 connected by a pulling eye (not illustrated) to the clevis 13 and bolt (not illustrated) of swivel head formation 12 exceeds the preset compressive force established by set screw 54 and compression wave spring 52 against steel ball 41, steel ball 41 will be expelled or displaced from perimetral groove formation 50 in a direction outwardly from annular lip 42 into the inner portion 39 of passageway 38 thereby freeing the mating components 33 and 48 to separate longitudinally.

More particularly, when the pulling forces overcome the preset tension of wave spring 52 steel ball 41 is forced out of perimetral groove formation or recess 50 in male shaft portion 46 and into passageway 38 of the female portion 33 against the resistance of wave spring 52 thereby releasing components 33 and 48 and permitting the connector to separate or "disconnect".

The "disconnect" tension of wave spring 52 can be calibrated by pull testing on an hydraulic test bench. By increasing or decreasing the force applied to compression wave spring 52 against the steel ball 41 through turning of set screw 54 in accordance with the scale established in pull testing the release tension can be set to operate within a selected range.

The preferred nested compression wave spring 52 is suited for limited space applications and superior to other mechanical alternatives including a standard stainless steel helical spring. In comparison to a helical spring the required operating space for a wave spring 52 to achieve the desired tension is reduced by 50%. Moreover, wave compression springs are load-bearing and exhibit non-binding axial compression that will function in static or dynamic conditions and are preferred. In the first embodiment illustrated in FIG. 2 an assembly of a single stainless steel ball 41 with nested wave compression spring 52 and set screw 54 is utilized. The invention, however, contemplates that more than one such assembly can be introduced.

With reference to FIG. 3 an opposed second passageway 38a including a lower portion 39a and upper threaded portion 40a is drilled and tapped into the female portion 33 of the swivel head formation 18.

Similarly an integral annular lip 42a is shaped to seat stainless steel ball 41a to protrude therefrom and together with wave spring 52a and set screw 54a so that ball 41a registers within the same circumferential groove formation or recess 50 in surface 44 of male shaft portion 46.

Alternatively as shown in FIG. 4 a further modified female socket 35b and male shaft portion 46b are shown as extended and provided with two (2) perimetral groove formations or recesses 50b, 50c in spaced apart relation which groove formations serve to anchor the spring-loaded spherical steel balls 41b, 41c presented by suitably spaced apart radially extending passageways 38b, 38c formed in a matching extended female body portion 33b.

By providing multiple groove formations and spring-loaded ball assemblies in spaced apart relation as shown in FIG. 4 and opposed in the manner of FIG. 3, if desired, the forces generated to resist separation can be more finely tuned to provide greater precision in establishing "disconnect" tension levels or limits.

Also it is to be understood that the configuration of the female socket 35 and that of the male shaft portion 46 of the embodiment shown in FIG. 2 can be further modified, if desired, each to present succeeding mating sections of different diameters and each provided with the requisite perimetral groove formations and passageways with spring-loaded ball assemblies as depicted in FIGS. 3 and 4 to further modify and control disconnect tension to be set for a particular job.

With reference to FIG. 5 the modified swivel connector shown in cross-section utilizes the same swivel head formation 12 at one end including the tapped shaft portion 14 projecting into central hollow body formation 16 as in the connector of FIG. 2.

Central hollow body formation 16 of FIG. 5 presents at the opposite end a modified swivel head formation 18a.

The embodiment of FIG. 5 utilizes the same preferred combination of bearings for supporting swivel shaft portion 14 and includes the three same (3)-piece needle dual thrust bearing 20 and flanged Permaglide™ thrust bearing 21 as shown in FIG. 2 and for taking side loads.

Swivel head formation 12 through the tapped swivel shaft 14 is shown connected by threaded bolt 34 to central hollow body formation 16 for swivelling action or rotation about the aforesaid bearing combination in the same manner disclosed in FIG. 2.

Swivel head formation 18a in FIG. 5 as distinguished from swivel head formation 18 of FIG. 2, includes a mating male component 60 whose body portion 62 presents a cylindrically shaped projection 64 bounded by a longitudinally extending cylindrical surface 66.

Body portion 62 is provided with an open-ended two (2) step diameter passageway 68 extending longitudinally of mating male component 60 from the bight 70 of clevis portion 19a centrally along male shaft projection 64 and includes inner portion 72 and outer threaded or tapped portion 73 terminating in an angled portion 74 innermost which intersects with surface 66 of male projection 64.

A resilient stainless steel spherical ball 41d of a diameter corresponding substantially to that of the inner portion 72 of passageway 68 but with requisite clearance and hardened to RC 58–62 is positioned adjacent the bottom of inner portion 72 under the force of wave spring 75 and set screw 76. In that disposition spherical ball 41d is seated in tangential engagement against the surface of a second spherical ball 41e of the same characteristics which in turn engages or seats against an integral annular lip 78 so shaped that spherical ball 41e protrudes beyond lip 78 only up to between twenty-five (25) percent to forty (40) percent, a minor portion of its girth.

The generally cylindrically shaped surface 80 of socket 82 in mating female component 84 is releasably threadably connected as at 32a to central hollow body 16 and embraces the surface 66 of mating male component 60 and presents a matching groove formation 86 to spherical ball 41e with opposed surfaces 66, 80 having sufficient clearance for longitudinal sliding fit and to allow for requisite displacement under swivelling action of the components.

FIG. 6 details a variation in the disconnect structure shown in FIG. 5 wherein a second angled inner passageway 74f is provided and so arranged that a third such ball 41f of the same characteristics is so disposed therein as to seat against the annular lip 78f to present a minor portion of ball 41f beyond opposed surface 66 into registration with the matching groove formation 86.

In this alternative the centrally located ball 41d is in tangential contact with both balls 41e and 41f which under the force imposed by wave spring 75 under the setting of set screw 76 fully register within the same mating groove formation 86 of the female component 84.

It is to be understood that the embodiments of the disconnect structures of FIGS. 5 and 6 also constitute a swivel connection between the male and female elements 60 and 84 interconnected by the projecting portions of the balls 41e and 41f registering in the groove formation 86.

Such an arrangement exhibited by all embodiments of the connectors enhances the utility of the connectors in that any additional swivelling action will tend to reduce twisting and thereby serve to maintain the disposition of the hauling line and towed cable.

It is to be noted that the female component 84 in the embodiment of FIG. 6 is provided with a suitable grease valve 88 located in passageway 90 for delivery of lubricant to the internal cavity of hollow body formation 16.

Also it is to be noted that a circumferential recess 92 for the reception of an additional O-ring 94 is provided at the point of connection of the female component 84 to the hollow body portion 16 as a further barrier to the ingress of dirt, water and other contaminating material.

The Bearing Structures

The employment of a three (3) piece needle bearing 20 in combination with a single flanged Permaglide™ thrust bearing 21 allows the swivel connector 18 to be pulled in either direction directing thrust to the thrust bearings in either direction and eliminating seizing of the hollow body portion 16 and shaft portion 14 when the connector is pulled around a sheave, pulley or bullwheel.

The Permaglide™ flanged thrust bearing 21 and the three (3) piece needle bearing 20 are preferably welded or pressed fit into the housing presented by the hollow body portion 16 with a bonding paste.

The Permaglide™ flanged thrust bearing 21 can be placed on either end of the shaft portion 14 to reduce any excess shear factor that may develop when tensile loading is applied to the connector.

The Permaglide™ flanged thrust bearing 21 also supports the body of shaft portion 14 minimizing damage to that element.

Where the Permaglide™ flanged thrust bearing 21 is introduced and welded or pressed fit to the surfaces of the respective swivel head 12 formation and hollow body formation 16 both shaft and body wear are minimized.

The preferred O-ring 31 to be disposed within the machined groove 30 on the swivel end of the hollow body portion 16 accommodates a Nitrile Buna N-O-ring with a hardness of 98 sealing out dirt, water and debris.

As indicated such O-ring is preferably glued in place into its seat.

The characteristics of Permaglidem flanged thrust bearing 21 are disclosed in a brochure entitled Permaglide™ Plain Bearings (PAH-US069604) issued by In a Bearing Company Limited and is described as maintenance free and constituted by three layers: steel or bronze backing, bronze layer and sliding layer. A 0.2 to 0.35 MM thick porous bronze layer (tin bronze or tin/lead bronze) is sintered on to the steel or bronze backing.

In a rolling operation the pores of the bronze layer are completely filled with a mixture of polytetrafluorethyline PTFE) and lead (Pb). On top of the bronze layer a 0.01 to 0.03 MM thick sliding layer of polytetrafluorethyline (PTFE) and lead (Pb) is applied.

The outer diameter faces and butt joint of the Permaglide™ plain bearings are coated with a tin flash for protection against corrosion. The bronze backing gives the plain bearings of this material high corrosion resistance and good thermal conductivity.

The Permaglide™ flanged thrust bearing 21 is well suited for rotating and oscillating motion and has a high load carrying capacity, good sliding properties and reduces stick slip to a minimum, has a low coefficient of friction and no welding tendency with metals.

The materials of such bearing also have good embedding properties, no absorption of water and, therefore, no swelling, and chemically resistance because of the suitable electroplating and steel backing, faces and back joint faces.

It is also noted that the Permaglide™ materials are electrically conductive with no electro-static charging and have low mass and minimum space requirements.

Each three (3) piece bearings 20 and 22, respectively, consists of two (2) case hardened and precision ground steel flat washers joined together with either an assembly of needle rollers or balls and retainers disposed therebetween. One source of such bearings is Torrington™.

Such three (3) piece bearings have dual thrust as well as three times the thrust load rating of other bearing types, and in the disposition shown in connectors embodying the invention allow for those connectors to be pulled in either direction and still maintain a high thrust as compared to other known types of connectors which exhibit only one-way thrust.

One-way thrust bearings can result in bearing damage as the pulling forces are applied incorrectly through the swivel head which ultimately will cause serious damage to a fibre-optic cable being pulled or towed.

By the use of the dual thrust three (3) piece bearing assemblies 20, 22 or in conjunction with the Permaglide™ flanged thrust bearing 21 or washer bearing 23 as shown in relation to the swivel shaft portion 14 in the illustrated embodiments a dual-purpose thrust is established.

More particularly a dual thrust three (3) piece needle bearing 20 can be installed on both ends of the shaft portion 14 of the connector of FIG. 1, 4 or 6 or a combination of one of a radial thrust ball bearing 22 on one end for radial load and a dual thrust three (3) piece bearing 20 on the opposite end allowing for dual purpose thrust in whatever direction the load is applied.

Depending on the application any combination of the three types of bearings, Permaglide™ flanged thrust bearing 21 or washer bearing 23, the three (3) piece needle thrust bearing 20 or radial ball bearing 22 may be used in conjunction with one another, achieving dual thrust in either direction.

"Disconnect" Characteristics

The configuration of the stainless steel spring-loaded ball assemblies of the embodiments of FIGS. 5 and 6 allows for greater spring tension. The configuration of the passageway is no longer confined to the body wall thickness of the components of the swivel connector in order to achieve the necessary tension but to the length and diameter of the male body portion permitting greater tension to be applied to the compression spring to achieve approximately a seventy-five (75) percent increase in tension, resulting in a higher disconnect rating.

Further, if greater than 5,000 psi disconnect capacity is required the dimensions of the components of the swivel connectors can be increased, the nested compression wave spring diameters increased and if using a helical spring the wire diameter can be increased and suitably heat treated, all of which provide for greater disconnect tension.

The components of the connectors, in accordance with the invention, are all derived from suitable high-strength stainless steel.

Each connector embodying the invention can be metal-stamped to show the disconnect load range for the particular swivel connector to minimize error.

When the applied forces to the connectors overcome the disconnect tensions the spring-loaded ball assemblies are displaced into the passageways allowing the components to disconnect and separate. To reset the separated units are reunited by snapping them back together when aligned, with the spring-loaded ball assemblies registering in the respective groove formations.

It will be understood that the preferred embodiments of the invention have been described and illustrated, and that persons skilled in this field may alter or vary the arrangement or relationships disclosed without departing from the spirit and scope of the invention as defined in the appended claims.

What I claim is:

1. In a connector for hauling cable, a first mating component including a socket formation aligned for axial reception of and disconnection from a matching projection formation presented by a second mating component in which a surface of engagement of each said socket formation and said projection formation engage in sliding fit, releaseable means for joining said mating components in mating relation including a spring-loaded displaceable means mounted in one of said mating components and extending beyond its surface of engagement and registering within a matching recess in the surface of engagement of the other mating component, means for regulating spring-loading of said displaceable means such that displacement from said recess and disconnection occurs only when tensile load applied to said mating components exceeds compressive force imposed by said regulating means upon said spring-loaded displaceable means, one of said mating components including a hollow body portion in axial alignment with said socket formation and said projection formation, said hollow body portion supporting a swivel head at the end therefore opposed to said mating component, said swivel head including a shaft portion projecting into said hollow body portion in axial alignment therewith learning means presented centrally of said hollow body portion for supporting said shaft portion for rotation therein, and means carried by said shaft portion for securing said shaft portion and said hollow body portion against separation.

2. A connector according to claim 1, wherein said learning means includes dual thrust bearing means engaging said shaft portion adjacent each end thereof.

3. A connector according to claim 1 in which said spring-loaded displaceable means is mounted in said socket formation of said first mating component and with said recess in said surface of engagement of said projection formation of said second mating component.

4. A connector according to claim 1, in which said spring-loaded displaceable means is mounted in said projection formation of said second mating component, and said recess is in said surface of engagement of said socket formation of said first mating component.

5. A connector according to claim 1 in which more than one of said spring-loaded displaceable means is mounted in said one mating component in spaced-apart relation and more than one of said matching recess is in the surface of engagement of said other mating component in spaced-apart relation for respective registration with each of said spring-loaded displaceable means.

6. A connector according to claim 1 in which said spring-loaded displaceable means is mounted in said mating projection formation and includes an assembly of helical spring means and at least two associated ball bearings disposed within a passageway, said passageway including one or more angle portions extending in angled relation inwardly from the surface of engagement thereof and merging with a central portion extending generally axially from said one or more angled portions thereof to the surface of engagement thereof, each of said angled portions terminating in an annular lip formation opening to said surface of engagement thereof and being of a configuration to seat one of said ball bearing therein in sliding fit and present a minor portion thereof beyond said surface of engagement thereof and a portion thereof to the other ball bearing in displaceable tangential contact disposed in sliding fit in said central portion under loading of said helical spring means.

7. A connector according to claim 1 wherein said bearing means includes a three-piece dual thrust bearing enclosing said shaft portion at one end and one of a flanged dual thrust bearing, radial thrust roller bearing and a three-piece needle dual thrust bearing enclosing said shaft portion adjacent the other end whereby the connector can be used to haul cable in either direction.

8. A connector according to claim 1 in which said spring-loaded displaceable means includes an assembly of helical spring means and associated ball bearing means disposed in sliding fit within passageway extending from the surface of engagement of one of said socket formation and said matching projection formation to the surface of engagement thereof, said passageway including an annular lip formation opening to said surface of engagement and being of a configuration to seat said ball bearing means therein and present a minor portion thereof beyond said surface of engagement so as to register within said matching recess in the surface of engagement of the other of said socket and projection formations.

9. A connector according to claim 3 or 4 in which the surface of engagement of each said socket formation and said matching projection formation have a generally cylindrical configuration and said matching recess extends circumferentially throughout the extent of such surface.

10. A connector according to claim 1 in which more than one of said spring-loaded displaceable means is mounted in said one mating component for registration within said recess in the other mating component.

\* \* \* \* \*

UNITED STATES PATENT AND TRADEMARK OFFICE
CERTIFICATE OF CORRECTION

PATENT NO. : 6,554,524 B1
DATED : April 29, 2003
INVENTOR(S) : Jackson A. Smith

It is certified that error appears in the above-identified patent and that said Letters Patent is hereby corrected as shown below:

Column 12,
Lines 21 and 26, "learning" should read -- bearing --

Signed and Sealed this

Seventh Day of October, 2003

JAMES E. ROGAN
*Director of the United States Patent and Trademark Office*